United States Patent
Birkenbeil

(10) Patent No.: US 10,421,366 B2
(45) Date of Patent: Sep. 24, 2019

(54) ENERGY MANAGEMENT OF AN ELECTRIFIED VEHICLE

(71) Applicant: FORD GLOBAL TECHNOLOGIES, LLC, Dearborn, MI (US)

(72) Inventor: Thomas Birkenbeil, Hennef (DE)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 15/469,613

(22) Filed: Mar. 27, 2017

(65) Prior Publication Data

US 2017/0282741 A1 Oct. 5, 2017

(30) Foreign Application Priority Data

Apr. 1, 2016 (DE) .................. 10 2016 205 470

(51) Int. Cl.
| | |
|---|---|
| *B60L 58/12* | (2019.01) |
| *B60L 11/18* | (2006.01) |
| *B60L 1/00* | (2006.01) |
| *B60L 1/02* | (2006.01) |

(52) U.S. Cl.
CPC .......... *B60L 11/1861* (2013.01); *B60L 1/003* (2013.01); *B60L 1/02* (2013.01); *B60L 58/12* (2019.02); *B60L 2250/16* (2013.01); *B60L 2260/44* (2013.01); *B60W 2510/244* (2013.01); *Y02T 10/7005* (2013.01); *Y02T 10/705* (2013.01); *Y02T 10/7044* (2013.01)

(58) Field of Classification Search
CPC ................................... B60L 11/1861
USPC ........................................... 320/132
See application file for complete search history.

(56) References Cited

U.S. PATENT DOCUMENTS

| | | | |
|---|---|---|---|
| 8,403,101 B2 | 3/2013 | Musser | |
| 8,463,481 B2 | 6/2013 | Kelty et al. | |
| 8,751,084 B2* | 6/2014 | Marwell | B60L 1/003 414/719 |
| 2012/0316714 A1* | 12/2012 | Nagayanagi | B60L 7/18 701/22 |

* cited by examiner

*Primary Examiner* — Edward Tso
*Assistant Examiner* — Ahmed H Omar
(74) *Attorney, Agent, or Firm* — David Kelley; Brooks Kushman P.C.

(57) ABSTRACT

A system and method for controlling the electrical power consumption of selected consumers of an electric vehicle limits power to consumers in dependence upon the prevailing charge state of a battery that is provided for driving the vehicle. The electric power consumption of high current consumers is adjusted to use an available residual amount of energy in an efficient manner. Consumers may be selected and corresponding power limits or reduction factors for the consumers and associated battery states of charge via a vehicle graphical user interface.

20 Claims, 1 Drawing Sheet

ENERGY MANAGEMENT OF AN ELECTRIFIED VEHICLE

CROSS-REFERENCE TO RELATED APPLICATIONS

This application claims foreign priority benefits under 35 U.S.C. § 119(a)-(d) to DE Application 10 2016 205 470.8 filed Apr. 1, 2016, which is hereby incorporated by reference in its entirety.

TECHNICAL FIELD

The disclosure relates to a system and method for controlling the electrical power consumption of selected consumers in dependence upon the prevailing charge state of the battery of an electric or hybrid vehicle, collectively referred to as an electrified vehicle.

BACKGROUND

Electrified vehicles, such as electric vehicles and hybrid vehicles, are transportation means that are driven by means of electrical energy. The disclosure is intended in particular for motor vehicles, in other words road-borne vehicles, but in the broader sense any other vehicle that is driven by electrical energy is also included. If the electrical energy for driving the motor vehicles is stored in traction batteries in the electric vehicle, an energy management system for additional consumers is advantageous in order to maximize the range of the vehicle. Apart from being used in purely electric vehicles, the embodiments of the disclosure can also be used to control the electrical power consumption in hybrid vehicles.

If the battery of an electric vehicle achieves a low charge state, the vehicle changes from a normal energy consuming mode into a consumption-optimized energy consuming mode in order to be able to use the remaining energy in the case of a low consumption as efficiently as possible, for example in order to arrive at a charging station. This changeover frequently occurs in an abrupt manner and at a point in time when the energy of the battery has already mostly been consumed.

SUMMARY

A first aspect of the invention relates to a method for controlling the electrical power consumption of selected consumers of an electric vehicle in dependence upon the prevailing charge state of a traction battery. In one or more embodiments, a system or method comprises:

S1) Check the prevailing charge state of the battery,
S2) Set a power consumption mode of diverse high current consumers of the vehicle in dependence upon the prevailing charge state of the battery,
S3) Operate electric devices of the vehicle, in particular of an electric motor of the vehicle,
S4) Monitor the prevailing charge state of the battery during the running operation of the vehicle,
S5) Adjust the power consumption mode of the vehicle in that a specific target level setting of the electrical power consumption is set.

A system or method in accordance with one or more embodiments of the disclosure is advantageous because the range and operating time of the motor vehicle can be increased by virtue of controlling the electrical power consumption at an early stage. The power consumption mode can be set as a function of the charge state of the battery. This applies both for the start-up procedure and also for the entire battery discharge cycle. In particular, the electrical power consumption of high current consumers can be limited, wherein in addition to the electric motor said high current consumers include for example an electric heater and an air-conditioning system in the vehicle; "high current consumer" is a common technical term. Furthermore, the prevailing electrical power consumption is adjusted in a dynamic manner to suit the available energy.

A control unit is used to monitor the energy consumption and subsequently to adjust the power consumption mode of high current consumers in dependence upon the charge state of the battery. The control unit can be configured for this purpose either by way of a graphic user interface by the user or a default configuration of the control unit is active. In an advantageous manner, the power consumption mode also includes a specific level of the maximum power of electric devices on board the vehicle.

Furthermore, in one embodiment, the adjustment of the power consumption mode is controlled by virtue of reducing in steps the level of the electrical power consumption. As a consequence, an abrupt changeover from a normal consuming mode into a reduced consuming mode is avoided.

In one embodiment, the method uses the length of the distance that is to be traveled by the vehicle and also further parameters such as for example the temperature of the external and internal space (for ascertaining the power for the vehicle air-conditioning system) when calculating the power consumption limitation of selected consumers in order in a borderline case to cover the missing range by means of restricting the power. The term 'borderline case' means in this case a situation in which it has become critical whether the distance that is to be traveled can be achieved in the case of a prevailing power consumption mode. This can be the case for example if it becomes necessary during a journey to extend by a few kilometers the previously determined distance that is to be traveled and the original power consumption mode is not sufficient for this purpose. It is possible in an advantageous manner to determine the electrical power consumption according to how high the energy reserves of the battery are for the distance to be traveled. The term "possible" relates in this case to the highest possible electrical power consumption that can be achieved using the available energy.

A second aspect of the disclosure relates to a system for implementing a method in accordance with one or more embodiments comprising a control unit and a graphic user interface that are coupled to one another, wherein by way of the graphic user interface information regarding the charge state of the battery and a possible prevailing power limitation is displayed and control commands relating to the electrical power consumption of individual electric devices of an electric vehicle can be input and the control unit is configured so as to ascertain the electrical power consumption of individual electric devices and to perform the control procedure according to the control commands.

The advantages of the system correspond to the advantages of the method in accordance with associated embodiments.

A third aspect of the method relates to an electric vehicle having a system in accordance with one or more embodiments.

The embodiments are further explained with reference to the figures, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
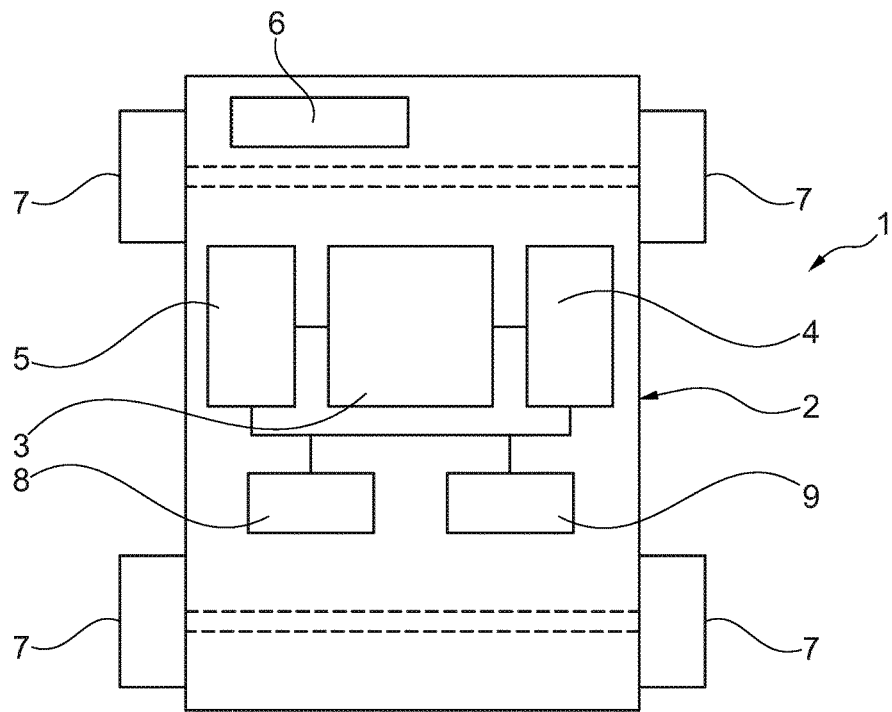
FIG. 1 illustrates a schematic view of an embodiment of a system in accordance with one or more embodiments.

As illustrated in FIG. 1, a motor vehicle 1 comprises a system 2 in accordance with one or more embodiments and having an electric motor 3, a control unit 4, a battery 5 and a graphic user interface 6. The electric motor 3 is supplied with energy by the battery 5. The electric motor drives the wheels 7 of the motor vehicle 1 by way of a transmission device (not illustrated). The motor vehicle 1 represents an electric vehicle, but may also be implemented by a hybrid vehicle.

The battery 5 is a traction battery that traditionally comprises multiple cell modules that are coupled together. It is also possible to provide further electric motors and also further batteries in the system 2. The wheels 7 can be driven jointly by one electric motor 3, as is illustrated in FIG. 1, or can also be driven in each case by a specific electric motor. Further electric devices that, in addition to the electric motor 3, are large consumers of electrical energy in the motor vehicle 1, said large consumers also being described as high current consumers, include an air-conditioning system 8 and a heating system 9. Further consumers of electrical energy in the motor vehicle 1 are illuminating devices, multi-media systems, blowers, seat/screen heaters and many more.

In the system 2, the control unit 4 and the graphic user interface 6 are coupled to one another. The graphic user interface 6 is configured or programmed to display information regarding the charge state of the battery 5 and a possible power limitation of selected consumers. The control unit 4 is configured or programmed to ascertain the electrical power consumption of the individual devices, to transmit the ascertained values to the graphic user interface 6 for display purposes and to perform the control procedure according to the control commands.

Furthermore, the graphic user interface 6 comprises control panels or input devices that can be used to manually input control commands relating to the electrical power consumption of individual electric devices of the electric vehicle. The control commands are transmitted by way of the graphic user interface 6 to the control device 4 that controls the individual devices of the vehicle 1 accordingly. It is provided that a user, in other words generally the driver of the relevant vehicle, can both set independently control commands in response to the information obtained and also instigate that the control unit 4 independently controls the prevailing power consumption mode on the basis of the remaining energy reserves.

Figure 2:
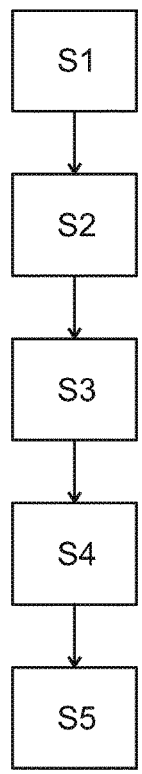
FIG. 2 illustrates a flow diagram illustrating operation of a system or method according to one or more embodiments.

As illustrated in FIG. 2, the prevailing charge state of the battery 5 is ascertained in a first step S1 in a method for controlling the electrical power consumption of selected consumers of the vehicle 1. The step S1 is ideally performed during the start-up procedure of the motor vehicle. The prevailing charge state is ascertained in a manner known to the person skilled in the art. In a second step S2, a power consumption mode of the vehicle is set in dependence upon the prevailing charge state of the battery. Said mode can be set by a user by way of the graphic user interface 6 or automatically by means of the control unit 4.

By way of example, the following dependency between the charge state of the battery 5 and the target level setting could be configured by the driver for a high current consumer.

If the prevailing charge state lies between 100% and 50%, the power for the high current consumer is not limited. The target level setting is 100%. If the charge state drops from 50% to 40%, the target level setting of the high current consumer reduces step by step from 100% to 70%. If the charge state drops from 40% further to 0%, the target level setting of the high current consumer remains constant at 70%. The threshold values and settings are features of one embodiment and can also comprise other values.

In a third step S3, the electric devices of the vehicle 1 are operated according to the settings performed in step S2. During the running operation, in other words the operation of the electric motor 3 and/or further electric devices in the vehicle 1, the charge state of the battery 5 is continuously checked in a fourth step S4.

In a fifth step S5, the prevailing power consumption mode of the vehicle 1 is controlled if it is ascertained in step S4 that the value of the charge state is below a threshold value. Accordingly, the target level setting of the electrical power consumption is adjusted according to the settings described in step S2.

In one embodiment, the prevailing electrical power consumption is not adjusted to the nearest low target level setting in an abrupt manner but rather it drops gradually over multiple intermediate steps. The electrical power consumption is adjusted from a higher level to a lower level in a linear manner in order to prevent an abrupt change in the available power that would result in a rapid drop in the available power.

It is possible by way of the graphic user interface to adjust the number and the position of graphic base points. By way of example, a graphic base point specifies that in the case of a 50% battery charge state the target level setting for a high current consumer is 100% power. A further graphic support point specifies that in the case of a 30% battery charge state the target level setting is 50% power. When the battery charge state is between 50 and 30%, the target level setting drops in a linear manner from 100% to 50% and does not drop in an abrupt manner.

It is thus possible to adjust the target level settings also in the case of other charge states as the value that is stated by way of example. It is also possible to adjust other target level settings and other intermediate target settings. If the output power of the drive train can also be restricted in dependence upon the battery charge state, this should be indicated to the user. It is possible to use for this purpose by way of example a pointer instrument or the graphic user interface. Ideally, the accelerator pedal should comprise a kick-down function by means of which the restriction can be overridden and temporarily the maximum drive output made available. This is expedient for example in order to reduce the risk of an accident in the case of critical driving situations (for example, during an overtaking maneuver).

In a further embodiment, it is possible to selectively adjust specific high current consumers of the vehicle 1 to a lower electrical power consumption or also to completely switch off said high current consumers. In addition to the electric motor 3, the air-conditioning system 8 and the heating system 9 in particular consume large amounts of energy. It is possible to instigate that the electrical power consumption is controlled individually for each device. In other words, the electrical power consumption of different high current consumers can be set individually and independently of one another (in dependence upon the battery charge state). It is possible for this purpose for example to switch backwards and forwards between different screen views of the graphic user interface. It is possible to establish whether individual energy-consuming devices are already adjusted to a reduced power in the case of a previously defined charge state of the battery. This can be advantageous for example if the anticipated length of a distance that is to be traveled is in the upper region of the range of the vehicle in order to provide greater energy reserves.

It is possible to store a complete setting and for example to call up a complete setting using a push button (similar to the station buttons for radio transmitters). Consequently, each user of the vehicle is able to call up his individual settings by means of pressing a button, without having to repeat the settings each time.

In the described exemplary embodiments, it is possible by way of example and in particular to vary the values of the charge states and power level settings. The described embodiments can be readily combined with one another.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly described or illustrated in the Figures.

What is claimed is:

1. A method for controlling an electrified vehicle, comprising:
    by a vehicle controller:
        limiting electric power consumption of selected power consumers of the vehicle in dependence upon a traction battery state of charge (SOC), the power consumers selected via a graphical user interface communicating with the controller, the graphical user interface allowing a user to specify a relationship between the battery SOC and the limiting of electric power for each selected power consumer.

2. The method of claim 1 wherein the relationship is a linear relationship such that the electric power consumption is linearly reduced in response to a corresponding reduction in the battery SOC.

3. The method of claim 1 wherein the graphical user interface allows a user to specify starting and ending SOC values and corresponding starting and ending electric power consumption reduction values for at least one of the selected power consumers.

4. The method of claim 1 wherein the selected power consumers include a vehicle air conditioning system and a vehicle heater.

5. The method of claim 1 wherein the selected power consumer comprises a vehicle air conditioning system, the method further comprising ascertaining power consumption of the air conditioning system based on internal and external vehicle temperatures.

6. The method of claim 1 further comprising controlling at least one electric consumer based on a default power consumption limitation in response to no limiting values being entered via the graphical user interface.

7. The method of claim 1 further comprising displaying current battery SOC and possible power consumers for selection of limiting electric power consumption on the graphical user interface.

8. The method of claim 1 further comprising displaying current values of electric power consumption of power consumers available for selection via the graphical user interface.

9. The method of claim 1 wherein the vehicle includes an electric machine that provides motive power, the method further comprising restricting power of the electric machine in dependence upon the SOC.

10. The method of claim 9 wherein the graphical user interface allows selection of the electric machine as one of the selected power consumers for limiting electric power.

11. The method of claim 1, the vehicle controller limiting electric power consumption of the selected power consumers in response to both battery SOC and a distance to a current vehicle destination.

12. The method of claim 1 wherein limiting electric power consumption is performed independently for each of the selected power consumers in response to an associated relationship between each of the selected power consumers and the battery SOC.

13. An electrified vehicle comprising:
    a traction battery;
    electric consumers powered by the traction battery;
    a graphical user interface; and
    a controller programmed to receive input from the graphical user interface that designates selected ones of the electric consumers and specifies an associated power relationship for each selected electric consumer based on associated traction battery state of charge values, the controller controlling power provided to each of the selected consumers based on the associated relationship.

14. The vehicle of claim 13 further comprising an electric machine coupled to the traction battery and providing motive power to the vehicle wherein the graphical user interface allows selection of the electric machine as one of the selected electric consumers.

15. The vehicle of claim 13, the controller programmed to linearly reduce power provided to the selected electric consumers as a function of traction battery state of charge values specified via the graphical user interface.

16. The vehicle of claim 13 wherein the graphical user interface or a pointer instrument displays current power consumptions and power limitations of the selected electric consumers.

17. The vehicle of claim 16 further comprising a traction motor, wherein the selected electric consumers include the traction motor.

18. A method for controlling a vehicle, comprising:
    reducing, by a controller, power provided from a traction battery to a selected electric consumer in response to a traction battery state of charge (SOC) being between first and second thresholds based on first and second power reduction values for the selected electric consumer, the electric consumer, first and second thresholds, and first and second power reduction values specified by input from a vehicle graphical user interface.

19. The method of claim 18, the controller reducing the power provided based on a linear power reduction between the first and second power reduction values corresponding to SOC values between the first and second thresholds.

20. The method of claim 18, the controller reducing the power provided in response to both the traction battery SOC and a current distance to a specified destination.

* * * * *